United States Patent
Bang-Andresen et al.

(10) Patent No.: US 9,249,899 B2
(45) Date of Patent: Feb. 2, 2016

(54) CABLE PULL-IN WITH INFLATABLE SEALING SECTION

(71) Applicant: Seaproof Solutions AS, Nesttun (NO)

(72) Inventors: Henrik Bang-Andresen, Bergen (NO); Thomas Dypevik, Kollveit (NO); Richard J. Toften, Paradis (NO)

(73) Assignee: Seaproof Solutions AS, Nesttun (NO)

( * ) Notice: Subject to any disclaimer, the term of this patent is extended or adjusted under 35 U.S.C. 154(b) by 0 days.

(21) Appl. No.: 14/127,502

(22) PCT Filed: Oct. 4, 2012

(86) PCT No.: PCT/EP2012/069595
§ 371 (c)(1),
(2) Date: Dec. 19, 2013

(87) PCT Pub. No.: WO2013/050451
PCT Pub. Date: Apr. 11, 2013

(65) Prior Publication Data
US 2014/0255102 A1    Sep. 11, 2014

Related U.S. Application Data

(60) Provisional application No. 61/544,284, filed on Oct. 7, 2011.

(51) Int. Cl.
*F16L 1/20* (2006.01)
*H02G 1/10* (2006.01)

(52) U.S. Cl.
CPC ... *F16L 1/20* (2013.01); *H02G 1/10* (2013.01)

(58) Field of Classification Search
CPC ............... F16L 1/123; F16L 5/00; H02G 1/10
USPC ........................................... 138/110; 405/157
See application file for complete search history.

(56) References Cited

U.S. PATENT DOCUMENTS

| | | | | |
|---|---|---|---|---|
| 3,699,690 A | * | 10/1972 | Watter | 405/157 |
| 4,110,991 A | * | 9/1978 | Torkuhl | 405/157 |
| 4,245,674 A | * | 1/1981 | Nakamura et al. | 138/110 |
| 4,806,049 A | * | 2/1989 | Cour | 405/161 |
| 5,186,215 A | * | 2/1993 | Gilleland | 138/98 |
| 6,425,708 B1 | * | 7/2002 | Siegfriedsen | 405/154.1 |

(Continued)

FOREIGN PATENT DOCUMENTS

| | | |
|---|---|---|
| EP | 1985845 | 10/2008 |
| FR | 2926346 | 7/2009 |

(Continued)

*Primary Examiner* — Tara M. Pinnock
(74) *Attorney, Agent, or Firm* — Christian D. Abel

(57) ABSTRACT

A cable pull-in system and method for offshore structures (1) of the type having a hollow interior extending from the sea bed to above the surface of the water and an entry hole (2) in the external wall of the structure. The system includes an elongated outer conduit assembly (7) within the interior of which is arranged an elongated cable member (10), the elongated outer conduit assembly being equipped with an inflatable sealing section (4) adapted for engaging the interior of entry hole (2) to seal and affix the outer conduit assembly. The elongated outer conduit assembly is pulled through the entry hole and up to a hangoff point above the water surface such that the inflatable sealing section (4) engages entry hole (2).

7 Claims, 9 Drawing Sheets

(56) References Cited

U.S. PATENT DOCUMENTS 7,182,104 B2 * 2/2007 Washburn .................... 138/118
2011/0226527 A1 * 9/2011 Ritchie-Bland .............. 174/669

FOREIGN PATENT DOCUMENTS

| GB | 2463940 | 4/2010 |
| WO | 2010/047584 | 4/2010 |

* cited by examiner

CABLE PULL-IN WITH INFLATABLE SEALING SECTION

FIELD OF THE INVENTION

The present invention relates to undersea cables, in particular flexible cables that are to be connected into offshore structures—e.g. monotowers as used in Offshore Wind turbines as foundation for Wind Turbines.

BACKGROUND

When undersea cables are to be connected into offshore structures—e.g. monotowers as used in offshore installations as foundation for Wind Turbines or into gravity platforms—there is a need to control and protect the cable from over-bending and jamming during pull-in and to protect the cable against dynamic forces during operation. It is also favorable to be able to seal off the inlet through which the cable enters the structure to prevent fresh seawater from entering the structure. The system must also enable fast installation, be safe to install and have a low risk of failure to shorten the installation time and thus the involvement of a costly cable laying vessel.

Prior art solutions have proven to be difficult to install, have a high failure rate which results in a costly installation and in some cases complete cable sections need to be replaced. The prior art solutions also do not give a proper dynamic protection during operation and problematic scouring conditions. In addition, the sealing solutions used have proven not to be reliable, and/or require timely subsea intervention with divers or remotely operated vehicles.

Known prior art systems may be built up to form an array prior to pull-in, and the cable can be pulled into the structure with the array fitted onto the cable at a fixed position, which in turn limits flexibility during the pull-in operation. Examples of known systems often involve a seal solution in which a sealing member or cone is affixed to the flexible cable, which seal or cone is arranged to be pulled into engagement with a defined interface unit arranged in the inlet into the monotower.

Known sealing arrangements have, inter alia, the following shortcomings:

1. Known arrangements require a mechanically tight fit onto the flexible cable to seal off. This is undesirable due to the fact that this may restrict the cable from moving (bending/flexing) as the cable components are compressed and restricted from individual movement when the seal is engaged onto the cable
2. The seal, when sealing onto a free flooded cable (no outer water tight jacket) commonly used in these applications, will not seal off the leaks between cable components inside the cable, hence seawater will leak into the structure through the cable itself.
3. Even a jacketed cable will be difficult to seal off when the cable is not round (the outer shape is only semi-circular, due to the larger components inside forming cross sectional diameter variations over the length of the cable.
4. The seals—when compression seals are used—may require diver (possibly un-manned remote operated vehicle) assistance or operation to engage the seals onto the cable when pulled into position
5. The mechanical lock of the array to the interface is an underwater mechanical device prone to require underwater inspection to confirm the lock is engaged.
6. When the cable is installed it is fixed and held in position at the interface to the structure—plough- and jetting—operation when protecting cable by burial into the sea bed, may tension the cable, resulting in increased stress and long free span which will affect the life time of the cable.
7. The cable may not be exchanged without changing the protective system—this complicate repairs e.g. when cables are damaged by impact from undersea objects such as anchors, deflectors etc.

SUMMARY OF THE INVENTION

The invention provides a cable pull-in system for offshore structures of the type having a hollow interior extending from the sea bed to above the surface of the water and an entry hole in the external wall of the structure. The system comprises an elongated outer conduit assembly within the interior of which is arranged an elongated cable member. According to one aspect, the elongated outer conduit assembly is equipped with an inflatable sealing section adapted for engaging the interior of entry hole to seal and affix the outer conduit assembly. According to another aspect, the elongated outer conduit assembly is used without a sealing section. The elongated outer conduit assembly is pulled through the entry hole and up to a hangoff point above the water surface such that the inflatable sealing section engages entry hole.

The inflatable sealing section (4) comprises a flexible bladder (18) arranged to be inflated into sealing engagement with the entry hole into the structure.

DETAILED DESCRIPTION

Figure 1:
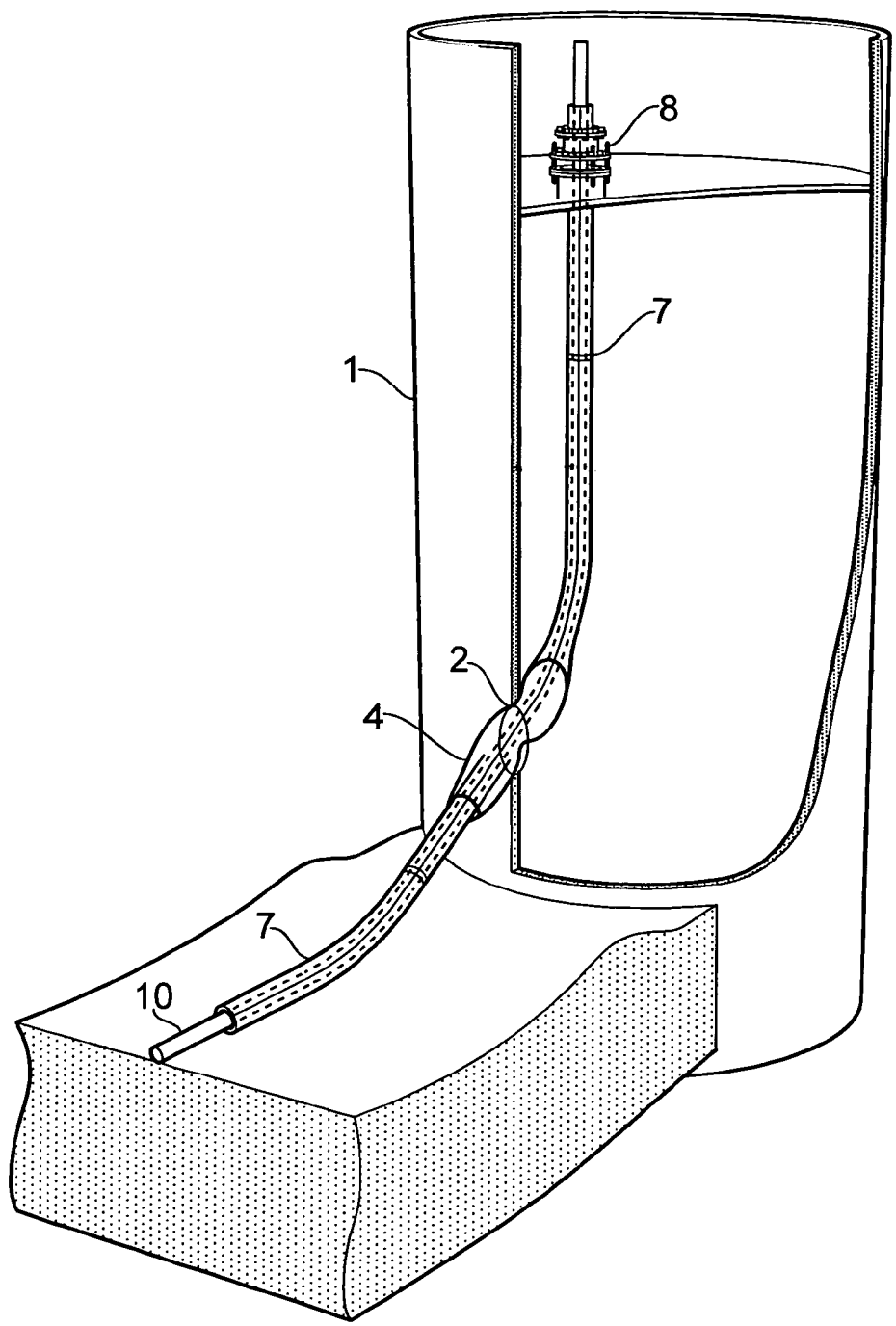
FIG. 1 is a perspective view of the system according to the invention.

As seen in the figures, according to one aspect the invention comprises a system and method for the pull-in and dynamic protection of cables and the like for an offshore structure (1) such as a monopile used for offshore wind turbines. The offshore structure has an entry hole (2), typically near the bottom of the structure, through which a cable (10) is pulled into the hollow interior of the structure, and up to the top of the structure.

The invention according to one aspect comprises an assembled, water-tight, flexible outer conduit assembly (7), running from the outside of the structure under water, through the entry hole (2) to a mounting or hang off point (8) above sea level inside the said structure (1). Arranged within the flexible outer conduit assembly is an elongated, flexible cable (10) or the like. The flexible outer conduit assembly (7) will preferably be made as thin walled, fiber reinforced polyurethane structure. The outer conduit assembly may be comprised of a plurality of individual shorter section co-joined by coupling means at each end. This will provide a flexible yet strong structure that will withstand mechanical bending and tension forces, impacts, wear and abrasion during pull-in and operation. For power cables, a thin walled outer conduit will lower potential heat transfer problems and allow cable suppliers to cost-optimize cable design. A non-metallic outer conduit will also eliminate corrosion and magnetic field issues found in conventional steel structures. Joints between the sections of the outer conduit assembly (7) will be in-line and sealed from the environment inside the sub-sea structure.

According to another aspect of the invention, the flexible outer conduit assembly (7) comprises an inflatable sealing section (4).

Figure 5:
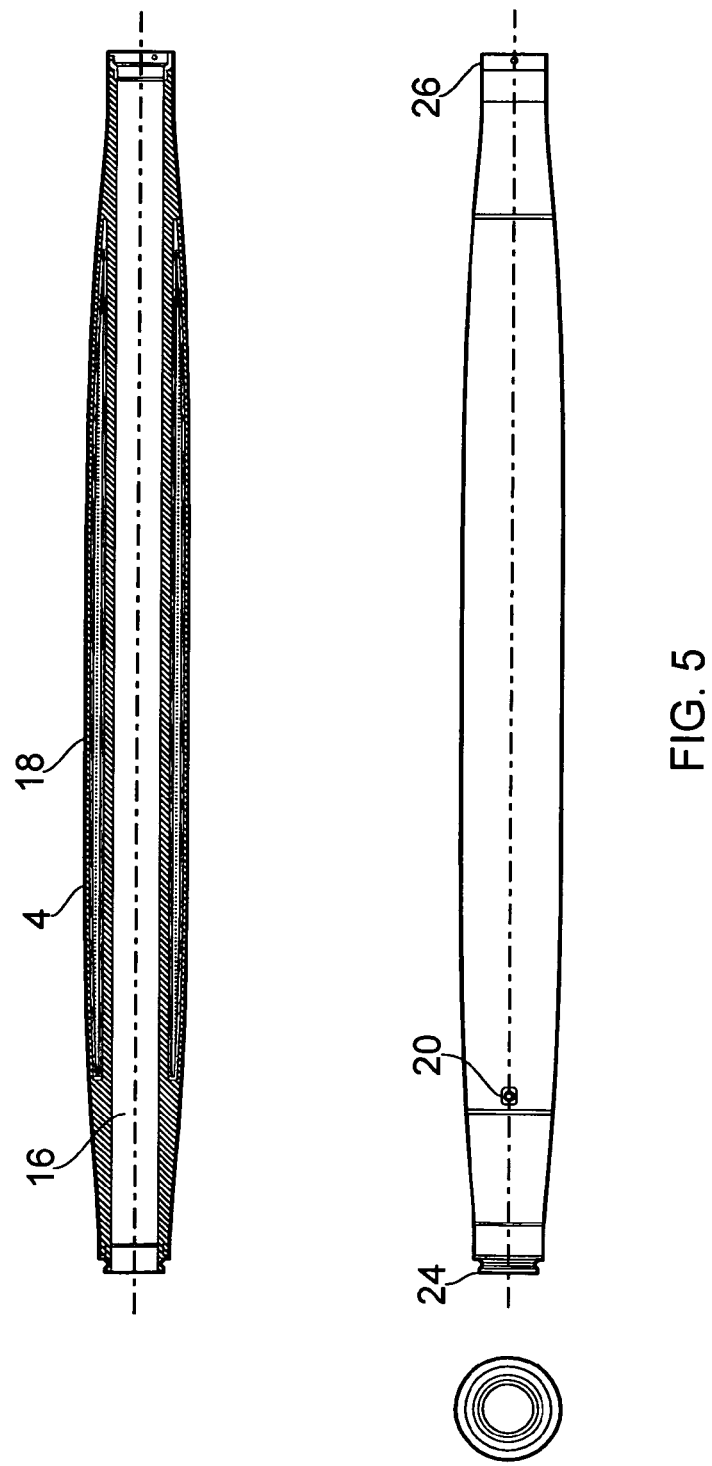
FIG. 5 is a cross sectional view of the inflatable sealing section
Figure 6:
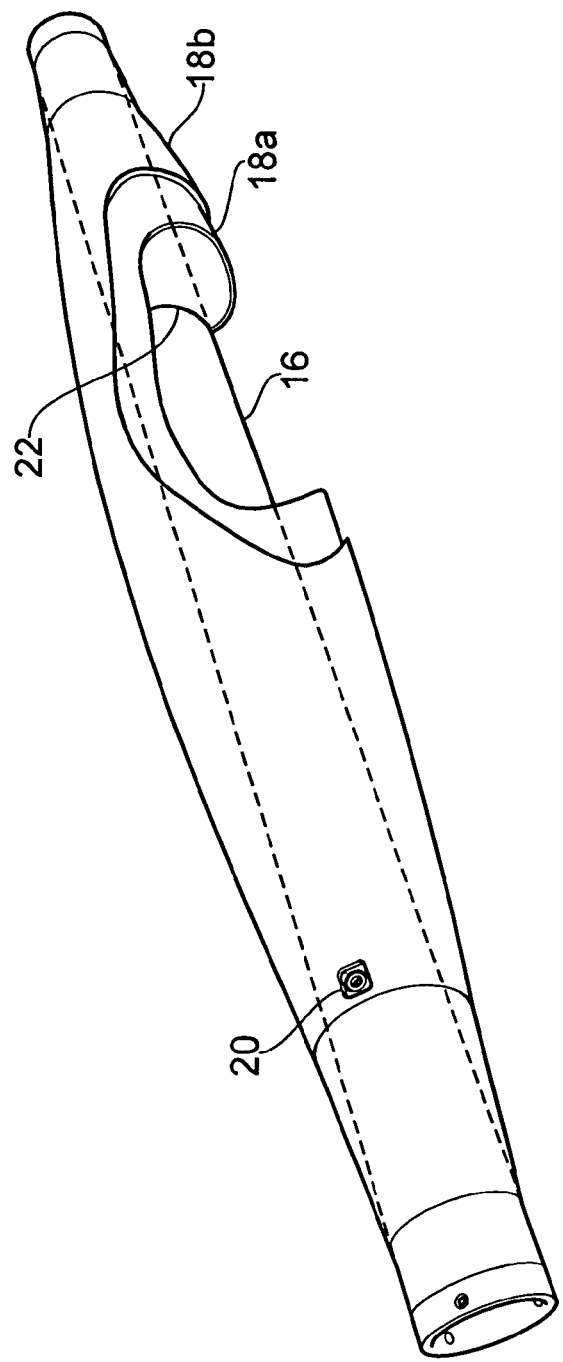
FIG. 6 is a perspective cut away view of the inflatable sealing section

As shown in FIGS. 5 and 6, the inflatable sealing section (4) comprises an inner, rigid cylindrical section (16), about which is moulded an inflatable bladder (18). According to one aspect, the inflatable bladder comprises an inner inflatable bladder 18a and an external inflatable bladder 18 b. A valve 20 is arranged in the bladder for introducing a fluid (22) into the bladder. The ends of the sealing section are equipped with male and female couplings (24) and (26). The bladder inside hold the variable volume, and the bladder may be protected by a flexible outer skin. The outer skin manages contact and impact stresses to allow the section to be pulled into and penetrate a structural hole.

In order to advantageously hold the inner diameter of the inflatable sealing section constant, cylindrical section (16) has a very high resistance against compression—to maintain a constant diameter over the variable volume range of the bladder (from deflated to maximum inflation).

The inflatable bladder is preferably made from an elastomeric material, allowing the walls to elongate or expand when inflated.

According to one aspect of the invention, the inflatable sealing section is made by applying a separate section of the elastomeric material onto the outside of the rigid cylindrical section. For the inflatable length the material is not bonded to the surface of the cylindrical section—allowing the gap between the layers to become the inflatable volume. At the ends of the inflatable section the outer layer is bonded (sealed) into the material of the rigid cylindrical section—making the gap between the layers a closed volume.

Valve (20) penetrates the outer layer of the inflatable section—into the closed volume allowing the volume to be filled with a fluid medium. The outer wall of the inflatable sealing section may be integrated with the bladder or may be a separate protective layer.

By introducing a fluid medium into the bladder under pressure, it is possible to expand the outer diameter of the inflatable sealing section to a size greater than the inner diameter of the entry hole (2) hole. According to one aspect, the sealing section is preinflated, such that the larger diameter bladder is pulled thru the smaller diameter entry hole. As the bladder is compressed as it is pulled through the hole, the volume of fluid is displaced by the restricted diameter of the entry hole. This increases pressure in the bladder. When pulling thru the interface hole, the displaced medium will pressurize further—forcing flow of the medium thru the restricted entry hole diameter and into the section on the inside of the entry hole.

The pressure differential between the part of the bladder outside of structure and the part of the bladder inside the structure will decrease/equalize. When the sleeve is fully pulled in, the pressure balances between the parts of the bladder on either side of the structure wall. This forces the outside diameter of the bladder on either side of the wall to exceed the diameter of the entry hole, thus sealing and locking the inflatable sealing section into the entry hole of the structure.

Figure 7:
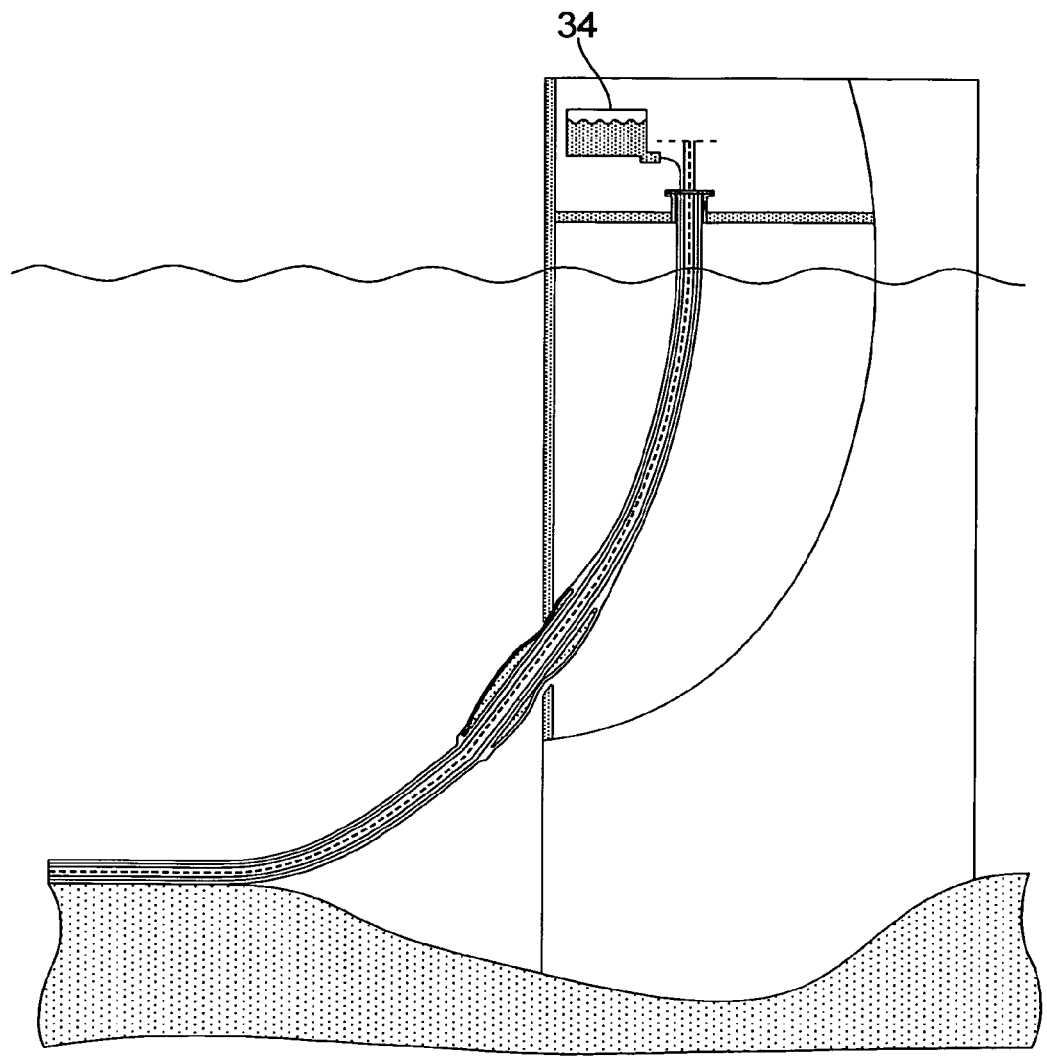
FIGS. 7 and 8 are elevational views illustrating alternative methods of inflating the sealing section
Figure 8:
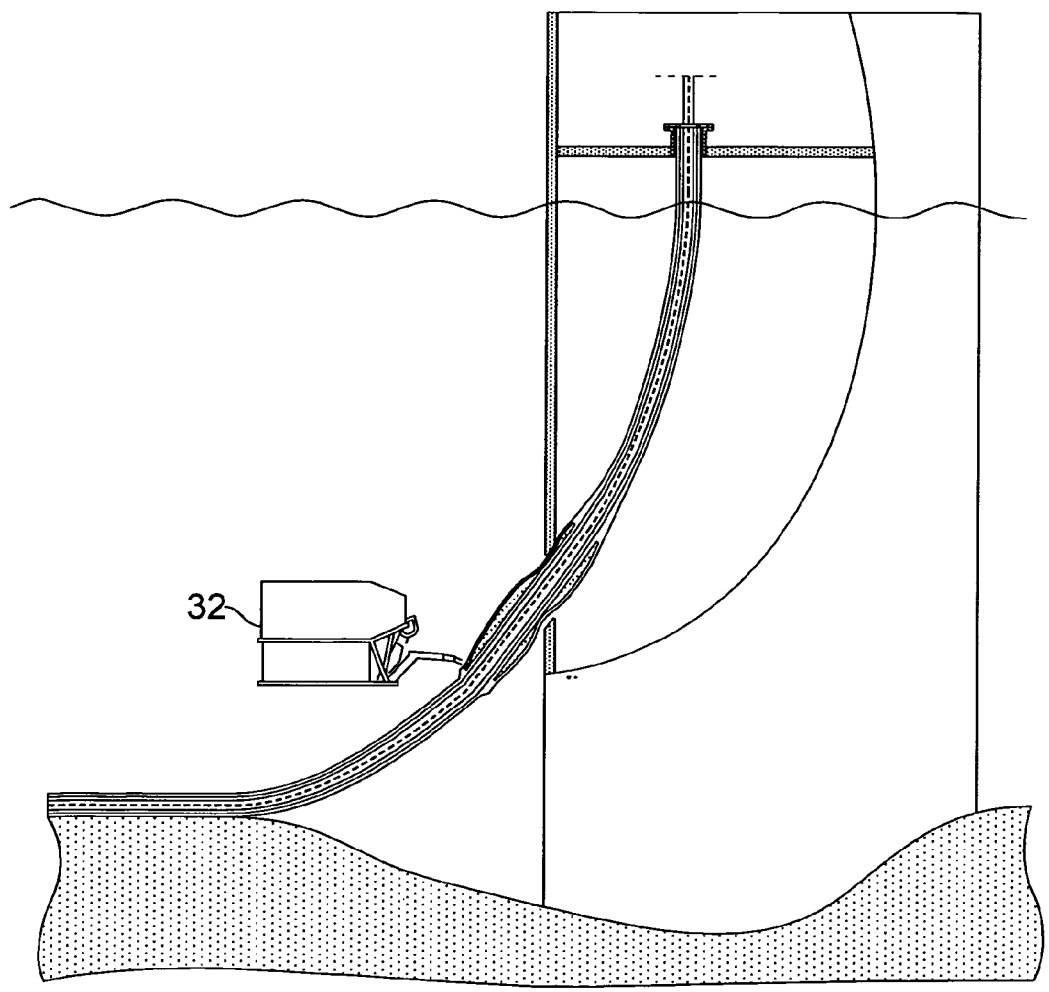

As shown in FIGS. 7 and 8 respectively, the bladder may be pressurized either from above the water surface, or underneath the surface, for example by an ROV.

Figure 9:
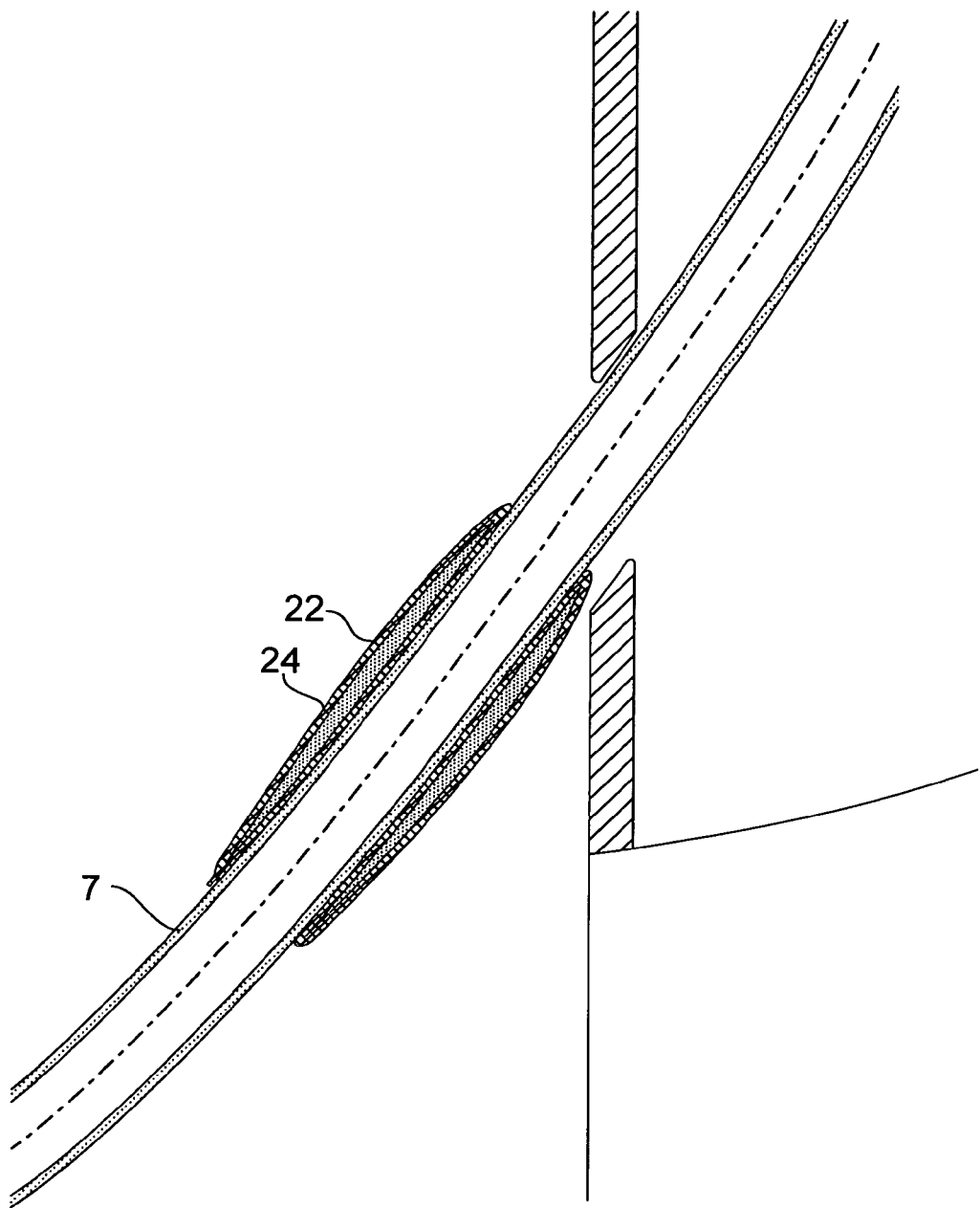
FIG. 9 is a cross sectional view of an alternative arrangement of a bladder

FIG. 9 shows an alternative arrangement for the inflatable bladder, in which the bladder is a separately arranged component in the form of a doughnut-like bladder (24) arranged around the circumference of the elongated conduit 7.

The fluid within the bladder may be any fluid that would perform the function of pressurizing the bladder to make an effective seal. According to one aspect of the invention, the fluid has a viscosity of from 0.5-20000 cP ($5 \times 10{-4}$–20 Pa·s). According to yet another aspect, the fluid is of a type that stiffens to a solid or semisolid state after a period of time (curing liquid).

Figure 2:
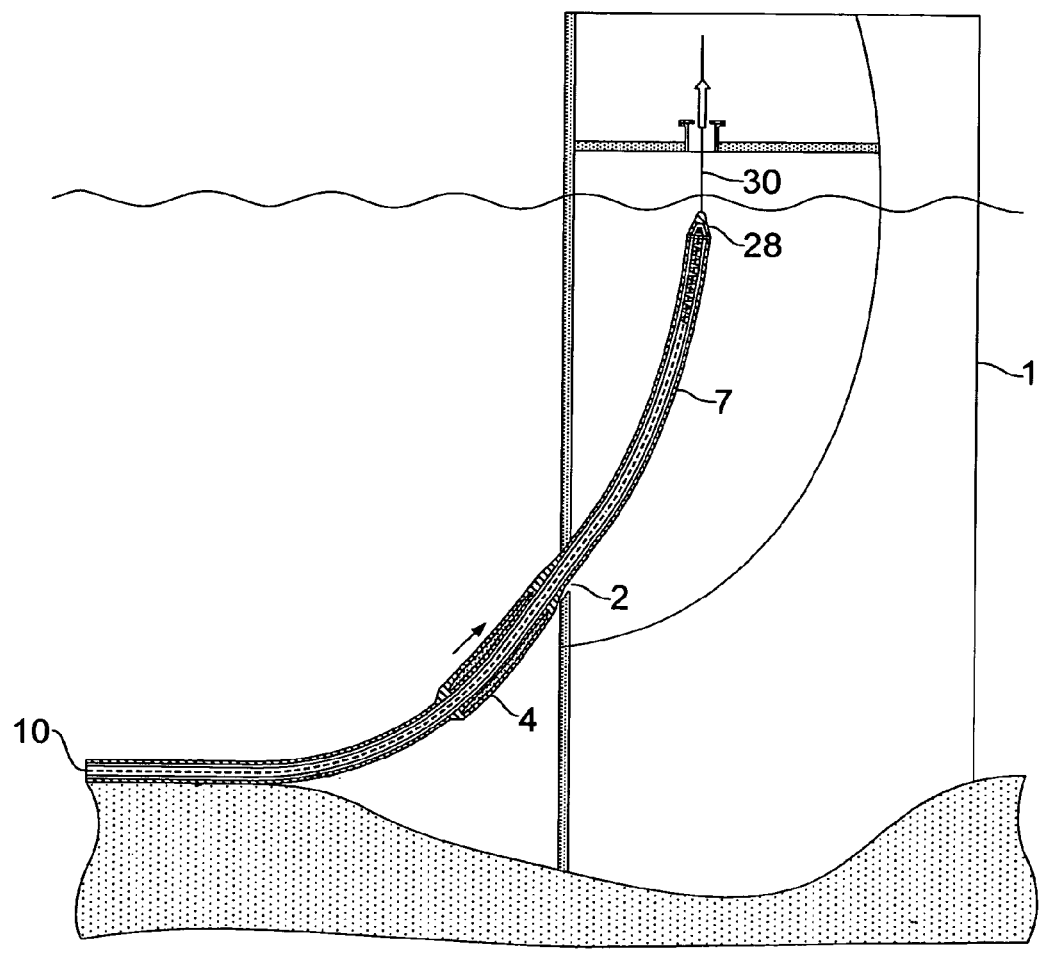
FIGS. 2 and 3 are elevational cross section views of the system according to the invention
Figure 3:
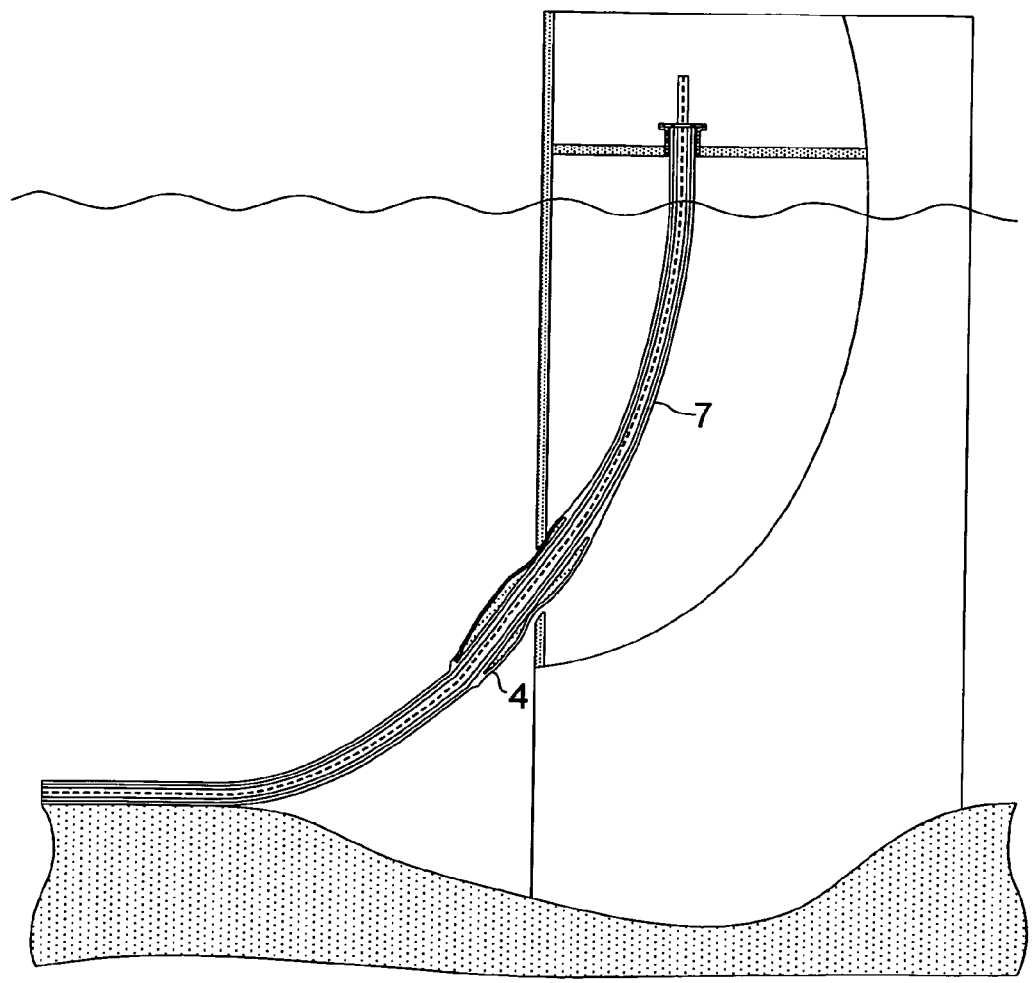
Figure 4:
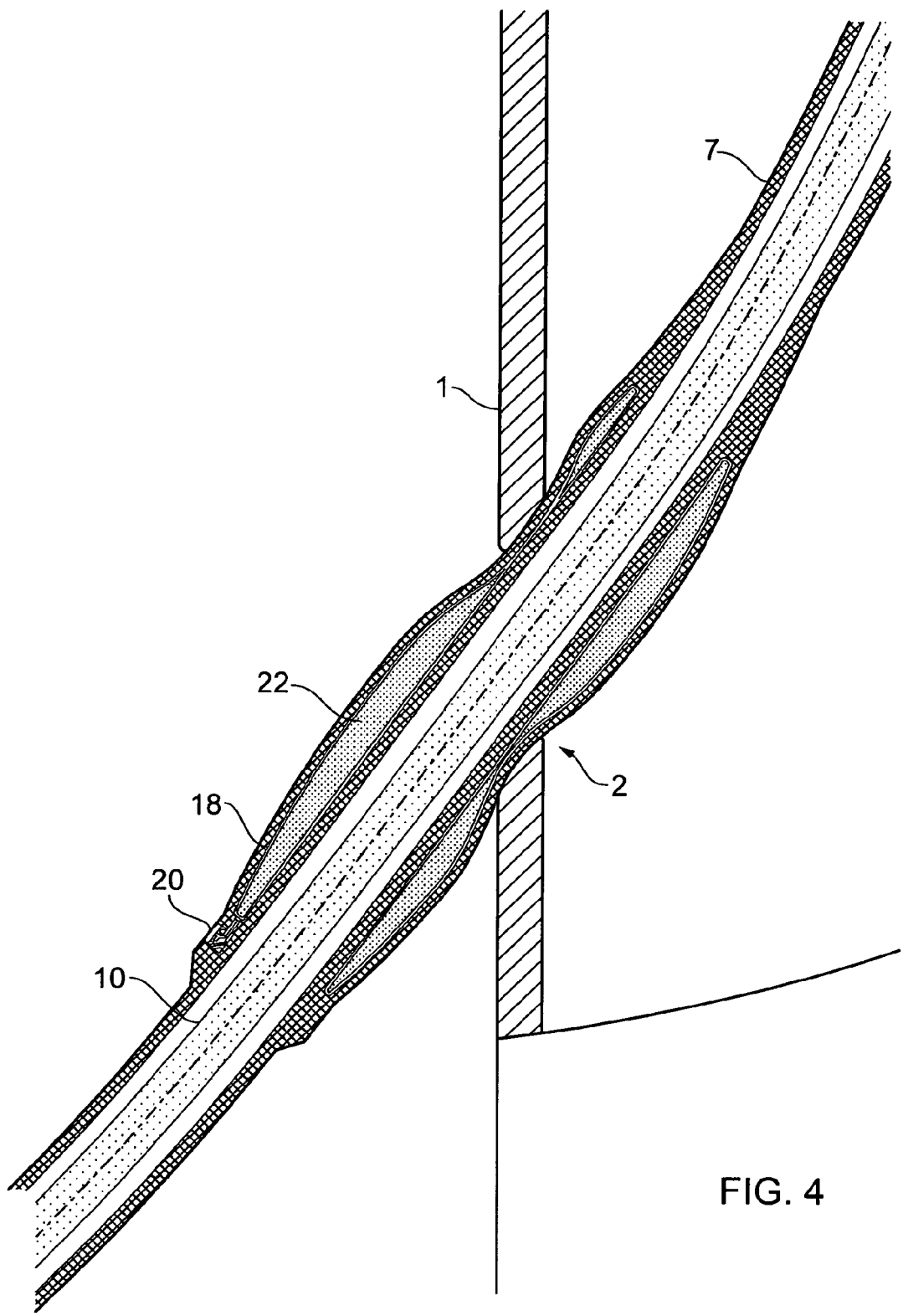
FIG. 4 is cross sectional view of the inflatable sealing section engaging the entry hole of the structure

As shown in FIG. 2, a cable is pulled into the structure by arranging a cable (10) inside the elongated conduit (7) and terminating the cable at a towing interface member (28) affixed to the end of the elongated conduit. A wire (30) is attached to the towing interface member, and is used to pull the elongated conduit through the entry hole (2) and up to a hang-off point above the water surface, such that such that the inflatable sealing section engages the entry hole (2). The inflatable sealing section is inflated, for example by an ROV (32) or from the surface via a pump/reservoir (34), into sealing engagement with the entry hole (2) as seen in FIG. 7 or 8.

The invention claimed is:

1. A method for pulling a cable into an offshore structure (1) of the type having essentially vertical wall or walls, a hollow interior and an underwater entry hole (2) extending through the wall to the interior, the method comprising the steps of:
   a. providing a water-tight, elongated, flexible cable protection conduit (7) of sufficient length to extend from outside the structure, through the entry hole (2) and up to a hang-off point above the water surface, the flexible cable protection conduit having an interior space adapted for arranging a cable (10) along its length, said elongated flexible cable protection conduit further comprising an inflatable sealing section (4) arranged to inflate into sealing engagement with the entry hole,
   b. arranging the cable (10) along the interior of the flexible cable protection conduit,
   c. terminating the cable at a towing interface member (28) located at the end of the flexible cable protection conduit (7),
   d. affixing a wire (30) to the towing interface member (28),
   e. pulling the flexible cable protection conduit via the wire (30) through the entry hole (2) and up to a hang-off point above the water surface, such that the inflatable sealing section engages the entry hole (2),
   f. inflating the inflatable sealing section into sealing engagement with the entry hole.

2. The method according to claim 1, characterized in that the flexible cable protection conduit is made of fiber reinforced polyurethane.

3. The method according to one of the preceding claims, characterized in that the inflatable sealing section is preinflated to a diameter greater than the diameter of the entry hole.

4. The method according to one of the preceding claims, characterized in that the sealing section is inflated by an ROV.

5. The method according to one of the preceding claims, characterized in that the sealing section is inflated via a hose running from above the water surface.

6. The method according to one of the preceding claims, characterized in that the sealing section is inflated with a liquid having a viscosity of from 0.5-2000 cP.

7. The method according to one of the preceding claims, characterized in that the sealing section is inflated with a liquid of a type that stiffens to a solid or semisolid state.

\* \* \* \* \*